2,870,106

CHLOROPRENE RUBBER COMPOSITIONS CONTAINING SULFURIZED TALL OIL

Eric O. Ridgway, Scotch Plains, and Newell A. Perry, Hamilton Square, N. J., assignors to Ridbo Laboratories, Inc., Trenton, N. J., a corporation of New Jersey No Drawing. Application July 31, 1953
Serial No. 371,790

3 Claims. (Cl. 260—23.7)

This invention relates to cured and uncured synthetic rubber compositions containing certain chloroprene base elastomers and to the master batching and compounding thereof. More particularly, the invention is directed to those rubber compositions which contain the tough and nervy chloroprene polymers having viscosities in the range which cannot be determined by using the conventional Mooney viscometer.

Many types of chlorophene rubbers, or as they are sometimes called, "polychloroprenes," are at present being used for many purposes. Although the line of demarcation between the various types is not always clear and distinct, they can be generally classified in two groupings. In one group are the sulfur modified polymers which have a viscosity in the range which can usually be measured by conventional viscosity measuring techniques, such as the Mooney method. These are known as general purpose chloroprenes. The other grouping includes the unmodified chloroprene polymers whose viscosities are so high that they cannot be measured by the standard techniques referred to. An example of the latter type of chlorprene polymer is the "neoprene Type S," manufactured by the E. I. du Pont de Nemours & Co. It is with this type of chloroprene base elastomers that the present invention is most particularly concerned.

Type S neoprene is an unmodified chloroprene polymer which has been stabilized with a small amount of thiuram disulfide and also contains a non-discoloring antioxidant. It is used in its uncured state in the manufacture of crepe soling because of the unusual characteristics, both physical and chemical, possessed by this polymer. It is a very tough and nervy material and does not break down or soften during prolonged milling. Further it is not generally soluble in solvents for the general purpose chloroprenes, for example, aromatic hydrocarbons such as toluene, chlorinated solvents, such as carbon tetrachloride, certain ketones, such as methyl ethyl ketone, and the like. It has also been used to some extent as a stiffening agent for other rubbers both natural and synthetic. However, because of its toughness it cannot be readily admixed with other rubbers to any considerable degree and therefore its desirable properties cannot always be used to the best advantage.

One of the principal objects of the present invention is to provide a compounded or master batched unmodified chloroprene which can be readily admixed with both natural and synthetic rubbers so as to enable the desirable properties of the high viscosity polymer to be imparted to the rubber with which it is mixed, or which can even be used as such to supply the total elastomer of a vulcanizate containing usual rubber ingredients as required for specific purposes.

Another object of the present invention is to provide a method for the preparation or compounding and master batching such chlorprene polymers.

These objects are accomplished in accordance with the present invention by forming a homogeneous master batch of an unmodified chloroprene polymer which has a viscosity higher than that measurable by the Mooney method and an agent which plasticizes the chloroprene.

The agent can be intermixed with unmodified chloroprene polymers in conventional rubber mixing equipment. It incorporates more readily than usual plasticizers and a new and useful composition is thereby produced.

Regardless of the manner in which the sulfurized tall oil reaction product is incorporated with the chloroprene base elastomer, the advantages described herein will be obtained in the resulting composition.

When this agent is employed according to the present invention, it not only accomplishes these objects without impairing desirable properties of the high viscosity chloroprene base material, but still further in many instances it will result in advantageous changes in the properties of both the cured and the uncured chloroprene which will permit an even wider range of use thereof.

The agent to be employed according to the invention comprises the reaction product of tall oil and sulfur, prepared in the manner more fully described hereinafter.

The tall oil-sulfur reaction product is highly compatible with the high viscosity chloroprenes over a wide range of proportions. The quantity of the tall oil-sulfur reaction product to be used will vary somewhat according to the particular formulation being prepared and the properties desired in a particular batch, or in the uncured compound, or in the ultimately cured product, but in general quantities ranging from at least 20% even up to 300 or 400% calculated by weight on the basis of the chloroprene rubber present, are usable. For most purposes, a range from about 30% to 100% will give good results. However, in master batching of chloroprenes the quantity of tall oil used can in many instances be as much as about 400%.

Sulfurized tall oil plasticizes the high viscosity chloroprenes, and forms a homogeneous product with the chloroprene base. Thus the toughness and fortifying qualities of the mixture can be imparted to other elastomers into which have been mixed prepared master batches of the sulfurized tall oil reaction product and high viscosity chloroprene.

The master batched high viscosity unmodified chloroprene can be readily compounded with natural rubber, butadiene styrene copolymers, other chloroprene polymers, nitrile rubbers, other elastomers and reclaims of the foregoing. Considerable increases in desirable qualities are imparted to such compounds by this new product, such as increased hardness, modulus, tensile strength and tear resistance. Elongation can be retained or increased depending on the type of compound contemplated; the same is true with flexing life.

The sulfurized tall oil may be mixed with the high viscosity chloroprenes in an internal mixer, or on a roll mill. However, due to the great toughness of such polychloroprenes, certain precautions should be observed.

When an internal mixer is used, care should be taken that the high viscosity chloroprene is masticated and crumbled in the mixer, before the sulfurized tall oil is added, in order that the sulfurized tall oil will have a greater surface area to work on. If the chloroprene is in lumps of relatively large size, some of the sulfurized tall oil tends to act on the surface thereof as a sort of lubricant. Thus efficient mixing is hindered, because the large and small lumps will be covered with the sulfurized tall oil and will not be easily broken up since they hinder the shearing action of the mixer blades. On the other hand, when the chloroprene is broken up into relatively small pieces, the sulfurized tall oil is quickly adsorbed and in part absorbed.

A typical example, using an internal mixer, is the blending of 70 parts of sulfurized tall oil with 100 parts of neoprene Type S. After the mixer has been charged with the Type S, it is allowed to work until it is crumbled into small crumbs (relatively uniform particles about 1/16" to 1/4" in diameter). This takes about 4 or 5 minutes, sometimes less, depending upon the size of the charge, of the mixer, and its type and speed. Then between 25% and 50% of the sulfurized tall oil is added to the crumbly mass, where it quickly spreads over the surface of the crumbs and is quickly adsorbed and in part absorbed. Although this process is quite rapid, it should be given between 4 and 5 minutes or until the material has a dry appearance. Then the remainder of the sulfurized tall oil is added and the mixing continued until the crumb, which is still present, appears relatively dry.

This relative dryness is an indication that the sulfurized tall oil has been largely absorbed into the neoprene, and that the batch is ready to drop onto the sheeter mill below the internal mixer.

On the sheeter mill the mass comes together in a rough and "short" (a lack of cohesiveness) appearing sheet. After sheeting the stock is cooled, and is then remilled on a cold and rather tight mill which has the required shear action to bring the mass together into a homogeneous sheet which can be easily handled in subsequent operations.

It appears that the internal mixer distributes the sulfurized tall oil throughout the crumbs. There is some absorption into the neoprene S due to a certain amount of shear action in the mixer and the high affinity of the sulfurized tall oil for this elastomer. This preliminary mixing makes it easier to obtain the final complete dispersion on the roll mill.

The new product may also be prepared by direct mixing on a roll mill with differential roll speeds. In this case the neoprene Type S should be banded on a cold, tight roll mill. The sulfurized tall oil should be added slowly so as to not cause the mass to leave the nip of the rolls. As the sulfurized tall oil is incorporated the nip space between the rolls can be enlarged and the sulfurized tall oil added at a more rapid rate.

The compounding procedure set forth in co-pending application Serial No. 371,792, filed July 31, 1953, wherein the sulfurized tall oil reaction product is introduced into the elastomer first or early in the compounding operation, will be particularly advantageous in the compounding of the unmodified chloroprene rubbers.

The tall oil-sulfur reaction product contemplated for use according to the invention is prepared as follows:

First note that tall oil, which is a by-product of the manufacture of paper, comprises a mixture of fatty acids and rosin acids in roughly equal proportions, together with from about 3% to about 15% of unsaponifiables, including sterols, hydrocarbons, etc. The tall oil employed may be the crude by-product or may be a refined product, the latter being advantageous where white or light shades of colors are desired in the final vulcanized rubber or rubber product being produced.

The tall oil is heated together with from about 1% to 25% of sulfur, most advantageously from about 6% to 10%, the temperature of heating being between about 300° F. and 400° F., preferably in the neighborhood of 310° F. to 330° F. The time of heating should be continued until no free sulfur remains.

The desirable characteristics of the sulfurized product are apparently due to the content of fatty acids and rosin acids in the material employed for sulfurization. Therefore, it is advantageous in the heating of the tall oil with the sulfur to avoid severe time-temperature relationships (especially excessively high temperatures), because such severe treatment tends to decarboxylate rosin acids present and excessively increase the hydrocarbon or unsaponifiable content.

The sulfurized tall oil product comprises a homogeneous, highly viscous mass at room temperatures; and it is of a sticky consistency having a high affinity for rubbers of the kinds enumerated, and is almost completely compatible with such rubbers in any proportions.

A tall oil-sulfur reaction product prepared as described above will be substantially sulfur-free and this is of importance in formulations according to the present invention because of the sensitivity of the chloroprene-type rubbers with respect to curing. This sensitivity is aggravated by the presence of free sulfur.

EXAMPLES

There are presented below a number of examples, most of which are given in comparative pairs or groups, so as to illustrate various of the features and advantages hereinbefore discussed.

To simplify the presentation of the examples and to enable tabulation of the data, there is given just below a statement fully identifying treatment conditions, testing results, and materials used in the examples and referred to therein only briefly or by identifying letters or figures for simplicity.

Considering the first of the materials used in the examples, note the following:

STO—Wherever this symbol appears in the examples sulfurized tall oil is meant. In all of the examples the sulfurized tall oil was prepared in the following manner: Crude tall oil was heated at a temperature of about 320° F. with about 8% to 10% of sulfur for about 3 to 4 hours.

The rubbers used in the various examples are identified as follows:

Neoprene Type S—This is an unmodified chloroprene polymer stabilized with a small amount of thiuram disulfide containing a non-discoloring antioxidant, made by E. I. du Pont de Nemours & Co. A very tough and nervy polymer.

Neoprene Type GN—A general purpose sulfur-modified chloroprene polymer stabilized by thiuram disulfide made by E. I. du Pont de Nemours & Co. ML4 54–75 when manufactured.

SS—Natural rubber smoked sheets.

X 625—A butadiene styrene copolymer prepared by the low temperature method. Mean raw Mooney 62 ML–4. Also known in the industry as GR–S–X625.

Marbon 8000—A thermoplastic resin comprising a butadiene styrene copolymer of high styrene content (approximately 85% of styrene) made by Marbon Corporation.

The plasticizers and softeners used in the examples may be identified as follows:

Circo light oil—A petroleum oil fraction made by the Sun Oil Co.

Neophax A—Vulcanized vegetable oil made by Stamford Rubber Supply Co.

P10 Cumar—A liquid of polymers of indene-cumarone and associated coal tar compounds made by the Barrett Division of the Allied Chemical and Dye Corp.

Cumar MH 2½—A resinous solid of polymers of indene, cumarone, and associated coal tar compounds made by the Barrett Division of the Allied Chemical and Dye Corp.

Staybelite—Hydrogenated rosin made by Hercules Powder Co.

The pigments and fillers in the examples may be identified as follows:

EPC—Easy processing channel carbon black.

XLCM—Extra light calcined magnesia made by General Magnesite and Magnesia Co.

Hard clay—Kaolin or china clay of relatively fine particle size.

Dixie clay—Kaolin, supplied by R. T. Vanderbilt Co.

Gamaco—Calcium carbonate made by Georgia Marble Co.

Red oxide—Red ferric oxide.

Hi-Sil—Fine particle size silica made by Columbia Southern Chemical Corp.

Silene EF—Hydrated, precipitated calcium silicate made by Columbia Southern Chemical Corp.

Rayox—Titanium dioxide supplied by R. T. Vanderbilt Co.

GD yellow—Master batch of color pigment in an elastomer made by E. I. du Pont de Nemours and Co.

Anti-oxidants used in the examples may be identified as follows:

Neozone A—Phenyl-alpha-naphthylamine, made by E. I. du Pont de Nemours & Co.

Antioxidant 2246—2,2′ methylene-bis (4-methyl-6-tertiary butyl phenol) made by the Calco Division of American Cyanamid Co.

Accelerators used in the examples may be identified as follows:

Altax—Benzothiazyl disulfide made by R. T. Vanderbilt Co.

Thermoflex A—25% di-p-methoxy diphenylamine, 25% diphenyl-p-phenylenediamine, and 50% phenyl-beta-naphthylamine.

NA 22—2-mercaptoimidazoline made by E. I. du Pont de Nemours & Co.

DPG—Diphenylguanadine made by Calco Division of American Cyanamid Co.

Conditions of treatment, test results, etc. are identified as follows:

Wherever cures are mentioned, they represent vulcanization treatments at the times indicated in minutes at temperatures of about 290° F.

All modulus and tensile figures are given in pounds per square inch.

All hardness figures are determined on the Shore A scale.

The Mooney viscosity figures are identified in the examples by "ML" or "MS," according to whether the determination was made with a large rotor or small rotor. In all instances the determinations were made at 212° F. The time in minutes of the Mooney test is also indicated by the numeral following the letters "ML" or "MS."

The Mooney scorch figures given in the examples represent the time in minutes required to raise the viscosity 5 points above the lowest point of viscosity reached during the test. In all cases these determinations were made at 250° F.

Examples 1 to 6

10 to 50 parts of sulfurized tall oil were added to 100 parts of neoprene S on a laboratory mill. 60 parts of sulfurized tall oil were added to the last batch on an internal mixer (Example 6).

|  | Example 1 | Example 2 | Example 3 | Example 4 | Example 5 | Example 6 |
|---|---|---|---|---|---|---|
| Neoprene S | 100 | 100 | 100 | 100 | 100 | 100 |
| STO | 10 | 20 | 30 | 40 | 50 | 60 |
| EPC |  |  |  |  |  | 17.5 |
| Viscosities MS-4 | 52 | 35 | 27.5 | 15 | 13 | 20 |

In the above examples the sulfurized tall oil incorporates readily and is effectively dispersed. It is to be noted that about 30% sulfurized tall oil has a marked influence on the viscosity. Particularly in the case of the compounds having a low concentration of sulfurized tall oil, the viscosity was such that ML viscosity readings could not be obtained. The viscosity value for Example 6 is somewhat higher because carbon black was added.

Examples 7 and 8

The product of Example 4 was mixed in the recipe of Example 8 below.

|  | Example 7 | Example 8 |
|---|---|---|
| SS | 100 | 90 |
| Product of Example 4 |  | [1] 14 |
| EPC | 10 | 10 |
| Zinc oxide | 5 | 5 |
| Stearic acid | 1 |  |
| Neozone A | 1 | 1 |
| Altax | 1 | 1 |
| Circo light oil | 3 | .55 |
| Sulfur | 3 | 3 |
| Totals | 124 | 124.55 |

[1] 10 Neoprene S 4 STO.

Physical tests were made on the cured stocks.

HARDNESS

| Cure | Example 7 | Example 8 |
|---|---|---|
| 15 | 39 | 45 |
| 60 | 39 | 48 |

MODULUS AT 400%

| | Example 7 | Example 8 |
|---|---|---|
| 15 | 450 | 475 |
| 60 | 400 | 600 |

TENSILE STRENGTH

| | Example 7 | Example 8 |
|---|---|---|
| 15 | 1,260 | 3,100 |
| 60 | 940 | 2,930 |

PERCENT ELONGATION

| | Example 7 | Example 8 |
|---|---|---|
| 15 | 550 | 710 |
| 60 | 490 | 630 |

The greatly improved physical properties illustrate the advantage of using a master batch of a large quantity of sulfurized tall oil mixed with neoprene S in the compounding of Type S with natural rubber.

Master batches like the above may also be mixed with GR–S, reclaims, nitrile, and a variety of other rubbers and mixtures of same.

Examples 9 and 10

These examples illustrate the effect on viscosity of mixing sulfurized tall oil with neoprene Type S. In Example 9, 20 parts of STO were mixed with 100 parts Type S. In Example 10, 50 parts of STO were mixed with 100 parts Type S.

|  | Example 9 | Example 10 |
|---|---|---|
| ML-4 | 57½ | 25½ |

Examples 11 and 12

Example 11 illustrates the effect of master batching sulfurized tall oil with Type S and a reinforcing pigment. Example 12 illustrates the use of the master batched rubber of Example 11 to mix with another type of neoprene.

|  | Example 11 | Example 12 |
|---|---|---|
| Neoprene S | 100 | 10 |
| STO | 50 | 5 |
| Hi-Sil | 10 | 1 |
| Neoprene GN |  | 100 |
| Viscosities, ML-4 | 42½ | 29 |

It will be noted that the reinforcing pigment raised the viscosity of Example 11 over that of Example 10 which contained the same quantities of STO and Type S. However, the master batch of Example 11 incorporated well with the neoprene GN used in Example 12.

*Examples 13 to 16*

These examples illustrate the use of master batched sulfurized tall oil and Type S to stiffen, and otherwise improve, a neoprene stock.

|  | Example 13 | Example 14 | Example 15 | Example 16 |
|---|---|---|---|---|
| Master batch: | | | | |
| Type S | | 10 | 10 | 10 |
| STO | | 3 | 3 | 3 |
| Neoprene GN | 100 | 100 | 90 | 90 |
| Neophax A | 10 | | 10 | |
| XLCM | 4 | 4 | 4 | 4 |
| Hard clay | 10 | 10 | 10 | 10 |
| Gamaco | 10 | 10 | 10 | 10 |
| Red oxide | .55 | .55 | .55 | .55 |
| Stearic acid | 1 | | | |
| Thermoflex A | 1 | 1 | 1 | 1 |
| Sodium acetate | 1 | 1 | 1 | 1 |
| NA 22 | .3 | .3 | .3 | .3 |
| GD Yellow | .85 | .85 | .85 | .85 |
| Dibutyl phthalate | 10 | 10 | 7 | 7 |
| PIO Cumar | 2 | 2 | 2 | 2 |
| Zinc oxide | 50 | 50 | 50 | 50 |
| Totals | 200.7 | 202.7 | 199.7 | 189.7 |
| Relative viscosity | 26 | | 30 | |
| Mooney scorch | 25½ | | 29½ | |

The stiffening effect shown in the relative viscosities of Example 15 over the control, Example 13, is of note in view of the better scorch value of Example 15.

HARDNESS

| Physicals | Example 13 | Example 14 | Example 15 | Example 16 |
|---|---|---|---|---|
| 15 | 53 | 55 | 54 | 59 |
| 30 | 54 | 55 | 55 | 60 |
| 45 | 55 | 57 | 55 | 60 |
| 60 | 55 | 58 | 55 | 61 |

MODULUS AT 200%

| | | | | |
|---|---|---|---|---|
| 15 | 260 | 330 | 350 | 400 |
| 30 | 260 | 350 | 340 | 440 |
| 45 | 300 | 375 | 400 | 500 |
| 60 | 340 | 375 | 400 | 500 |

MODULUS AT 400%

| | | | | |
|---|---|---|---|---|
| 15 | 500 | 650 | 640 | 750 |
| 30 | 550 | 600 | 675 | 800 |
| 45 | 600 | 700 | 750 | 860 |
| 60 | 625 | 675 | 775 | 900 |

TENSILE STRENGTH

| | | | | |
|---|---|---|---|---|
| 15 | 1,775 | 2,330 | 2,025 | 2,375 |
| 30 | 1,800 | 2,250 | 2,050 | 2,250 |
| 45 | 1,750 | 2,275 | 2,000 | 2,275 |
| 60 | 1,700 | 2,275 | 1,840 | 2,230 |

PERCENT ELONGATION

| | | | | |
|---|---|---|---|---|
| 15 | 790 | 820 | 780 | 820 |
| 30 | 770 | 780 | 760 | 760 |
| 45 | 710 | 750 | 700 | 700 |
| 60 | 670 | 710 | 650 | 690 |

The all-over better physicals should be noted.

*Examples 17 to 19*

These examples illustrate the use of master batched Type S and sulfurized tall oil with Cold GR-S (X 625).

|  | Example 17 | Example 18 | Example 19 |
|---|---|---|---|
| Master batched: | | | |
| X 625 | 100 | | 100 |
| Marbon 8000 | 15 | | 10 |
| Staybelite resin | 15 | | |
| Master batched: | | | |
| X 625 | | 100 | |
| Type S | | 15 | 10 |
| STO | | 15 | 10 |
| Cumar MH 2½ | 7 | 7 | 7 |
| Zinc oxide | 5 | 5 | 5 |
| Dixie clay | 70 | 70 | 70 |
| Silene EF | 65 | 65 | 65 |
| Rayox | 5 | 5 | 5 |
| Stearic acid | 1 | 1 | 1 |
| Altax | 1.5 | 1.5 | 1.5 |
| DPG | .5 | .5 | .5 |
| Antioxidant 2246 | 1 | 1 | 1 |
| Paraffin | 1 | 1 | 1 |
| Sulfur | 3.5 | 3.5 | 3.5 |
| Totals | 190.5 | 190.5 | 190.5 |

| Cures at 30 minutes | Example 17 | Example 18 | Example 19 |
|---|---|---|---|
| Hardness | 95 | 83 | 92. |
| 200% modulus | 550 | 730 | 625. |
| 400% modulus | 660 | 1,040 | 830. |
| Tensile strength | 760 | 1,475 | 1,160. |
| Percent elongation | 620 | 570 | 630. |
| Specific gravity | 1.43 | 1.43 | 1.44. |
| Tear | Fairly good | Good | Very good. |

The above are shoe soling stocks. The sulfurized tall oil reinforced the stock and the Type S rubber toughened the stock. The remarkable improvement in modulus and tensile values should be noted, as well as the retention of elongation in spite of these improvements.

We claim:

1. A rubber composition comprising a chloroprene polymer having a viscosity higher than that measurable by the Mooney method and the thermal reaction product of tall oil and sulfur, the sulfur in the reaction product being about 1% to 25% by weight based on the weight of the tall oil, and the amount of said reaction product being from about 30% to about 100% by weight of the chloroprene polymer.

2. A composition for use in rubber compounding comprising a chloroprene polymer having a viscosity higher than that measurable by the Mooney method and the thermal reaction product of tall oil and sulfur, the sulfur in the reaction product being about 1% to 25% by weight based on the weight of the tall oil, and the amount of said reaction product being from about 100% to 300% by weight of the chloroprene polymer.

3. A vulcanizate comprising a chloroprene polymer having a viscosity higher than that measurable by the Mooney method and the thermal reaction product of tall oil and sulfur, the sulfur in the reaction product being about 1% to 25% by weight based on the weight of the tall oil and the amount of said reaction product being from about 20% to about 100% by weight of the chloroprene polymer.

References Cited in the file of this patent

UNITED STATES PATENTS 2,480,478   Kalman _____ Aug. 30, 1949

FOREIGN PATENTS 618,592   Germany _____ Sept. 11, 1935

OTHER REFERENCES

"Vinsol," Ad., Ind. Eng. Chem., 39, page 52 A, November 1947.

Barron: "Modern Synthetic Rubbers," page 438, Chapman & Hall (1949).